United States Patent
Son et al.

(10) Patent No.: US 11,128,021 B2
(45) Date of Patent: Sep. 21, 2021

(54) BATTERY PACK WITH CURVED CONNECTION PORTION

(71) Applicant: Samsung SDI Co., Ltd., Yongin-si (KR)

(72) Inventors: Kisuk Son, Yongin-si (KR); Jaepil Ahn, Yongin-si (KR); Chuljung Yun, Yongin-si (KR); Kyungho Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 252 days.

(21) Appl. No.: 16/214,669

(22) Filed: Dec. 10, 2018

(65) Prior Publication Data
US 2019/0181418 A1 Jun. 13, 2019

(30) Foreign Application Priority Data
Dec. 11, 2017 (KR) .................. 10-2017-0169534

(51) Int. Cl.
*H01M 10/48* (2006.01)
*H01M 10/42* (2006.01)
(Continued)

(52) U.S. Cl.
CPC ....... *H01M 50/572* (2021.01); *H01M 10/425* (2013.01); *H01M 10/48* (2013.01);
(Continued)

(58) Field of Classification Search
CPC ...... H01M 2/34; H01M 2/206; H01M 10/425; H01M 2/1077; H01M 10/48; H01M 2/202;
(Continued)

(56) References Cited

U.S. PATENT DOCUMENTS 9,362,543 B2 6/2016 Ahn et al.
2013/0302651 A1* 11/2013 Kim .................. H05K 1/0263
429/7

(Continued)

FOREIGN PATENT DOCUMENTS

JP 2004-071562 * 3/2004 ............. H05K 1/028
JP 2004-71562 A 3/2004
(Continued)

OTHER PUBLICATIONS

Machine translation of JP 2004-071562, Kitada et al., 2004 (Year: 2004).*

(Continued)

*Primary Examiner* — Kwang Han
(74) *Attorney, Agent, or Firm* — Lewis Roca Rothgerber Christie LLP

(57) ABSTRACT

A battery pack includes battery cells arranged in a first direction, a wiring board collecting state information about the battery cells, and a sensing portion including an input port through which the state information about the battery cells is input, an output port coupled to the wiring board and through which the state information about the battery cells is output, and a connection portion between the input and output ports. The connection portion extends in a curved shape with portions spaced apart from each other in a second direction crossing the first direction. Damage or dielectric breakdown of a conductive line transmitting signals relating to the state information about the battery cells may be prevented, and accumulation of stress in the conductive line or an insulating film may be prevented, because the conductive line or the insulating film is flexibly deformed in response to swelling of the battery cells.

15 Claims, 6 Drawing Sheets

(51) Int. Cl.
    *H01M 50/20*    (2021.01)
    *H01M 50/502*   (2021.01)
    *H01M 50/543*   (2021.01)
    *H01M 50/503*   (2021.01)
    *H01M 50/572*   (2021.01)

(52) U.S. Cl.
    CPC ......... *H01M 50/20* (2021.01); *H01M 50/502*
            (2021.01); *H01M 50/503* (2021.01); ***H01M
                                        50/543*** (2021.01)

(58) Field of Classification Search
    CPC .... H01M 2/30; H01M 50/572; H01M 50/503;
                H01M 50/20; H01M 50/502; H01M
                           50/543; Y02E 60/10
    See application file for complete search history.

(56) References Cited

U.S. PATENT DOCUMENTS

| | | |
|---|---|---|
| 2015/0194709 A1 | 7/2015 | Ju et al. |
| 2016/0294023 A1 | 10/2016 | Aoki |
| 2017/0236960 A1* | 8/2017 | Tourino ................ H01L 31/048 136/256 |
| 2017/0279160 A1 | 9/2017 | Kim |

FOREIGN PATENT DOCUMENTS

| | | |
|---|---|---|
| JP | 2014-22287 A | 2/2014 |
| JP | 2015-201274 A | 11/2015 |
| JP | 2016-225032 A | 12/2016 |
| JP | 2017-38039 A | 2/2017 |
| JP | 6136697 B2 | 5/2017 |
| KR | 10-2013-0104844 A | 9/2013 |
| KR | 10-2013-0125334 A | 11/2013 |
| KR | 10-2014-0002112 A | 1/2014 |
| KR | 10-2017-0110746 A | 10/2017 |

OTHER PUBLICATIONS

Korean Registration Determination Certificate dated Jul. 1, 2020, for corresponding Korean Patent Application No. 10-2017-0169534 (2 pages).

International Search Report, with English translation, of the International Searching Authority of corresponding PCT/KR2018/013366, dated Feb. 13, 2019, 5 pages.

Korean Office Action dated Mar. 13, 2020, for corresponding Korean Patent Application No. 10-2017-0169534 (7 pages).

* cited by examiner

BATTERY PACK WITH CURVED CONNECTION PORTION

CROSS-REFERENCE TO RELATED APPLICATION

This application claims priority to and the benefit of Korean Patent Application No. 10-2017-0169534, filed on Dec. 11, 2017, in the Korean Intellectual Property Office, the disclosure of which is incorporated herein in its entirety by reference.

BACKGROUND

1. Field

One or more embodiments relate to a battery pack.

2. Description of the Related Art

In general, secondary batteries are rechargeable unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) including a plurality of cells connected to one another are used depending on the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

SUMMARY

One or more embodiments include a battery pack structurally improved such that damage or dielectric breakdown of a conductive line transmitting signals relating to state information about battery cells may be prevented, and accumulation of stress in the conductive line or an insulative film may be prevented while the conductive line or insulative film is flexible deformed in response to swelling of the battery cells.

Additional aspects will be set forth in part in the description which follows and, in part, will be apparent from the description, or may be learned by practice of the presented embodiments.

According to one or more embodiments, a battery pack includes: a plurality of battery cells arranged in a first direction; a wiring board configured to collect state information about the battery cells from the battery cells; and a sensing portion including an input port through which the state information about the battery cells is input, an output port coupled to the wiring board and through which the state information about the battery cells is output, and a connection portion between the input port and the output port, wherein the connection portion extends in a curved shape with portions spaced apart from each other in a second direction crossing the first direction.

For example, the connection portion may include: straight portions extending in parallel to each other; and curved portions each configured to connect adjacent straight portions to each other.

For example, the straight portions may extend in parallel to each other in the first direction.

For example, the curved portions may be provided on end portions of the straight portions in the first direction.

For example, each of the curved portions may be curved to connect adjacent end portions of the straight portions and detour along a path greater than a distance between the adjacent end portions of the straight portions.

For example, the second direction may be perpendicular to the first direction, and a maximum distance in the path of the curved portion in the second direction may be greater than a maximum distance in the second direction between the adjacent end portions of the adjacent straight portions connected by the curved portion.

For example, the connection portion may include: a conductive line through which the state information about the battery cells may be transmitted; and an insulating film in which the conductive line is embedded.

For example, the connection portion may have a film shape extending in a main plane.

For example, the curved portions provided on both ends of the connection portion in the first direction may be deformed and lifted away from the main plain to face each other in response to swelling of the battery cells in the first direction.

Each of the curved portions may extend in a curved shape surrounding a penetration hole formed through the sensing portion.

For example, the connection portion may further include a first bridge connecting adjacent straight portions to each other.

For example, the curved portion may extend in a curved shape surrounding an outer side of the penetration hole, and the connection portion may further include a second bridge surrounding an inner side of the penetration hole.

For example, the first and second bridges may be provided using an insulating film of the connection portion.

For example, each of the curved portions may include: a conductive line through which the state information about the battery cells may be transmitted; and a dummy pattern isolated from and adjacent to the conductive line.

For example, the dummy pattern may be placed inside the conductive line along the path of the curved portion.

For example, the curved portion may extend in a curved shape surrounding a penetration hole formed through the sensing portion, and the dummy pattern may be placed between the penetration hole and the conductive line.

For example, the dummy pattern may have a smaller width than a width of the conductive line.

For example, the conductive line and the dummy pattern may include a same conductive material and may be covered with the same insulating film, and the insulating film may cover both end portions of the dummy pattern.

For example, the input port of the sensing portion may be connected to a bus bar through which adjacent battery cells are electrically coupled to each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
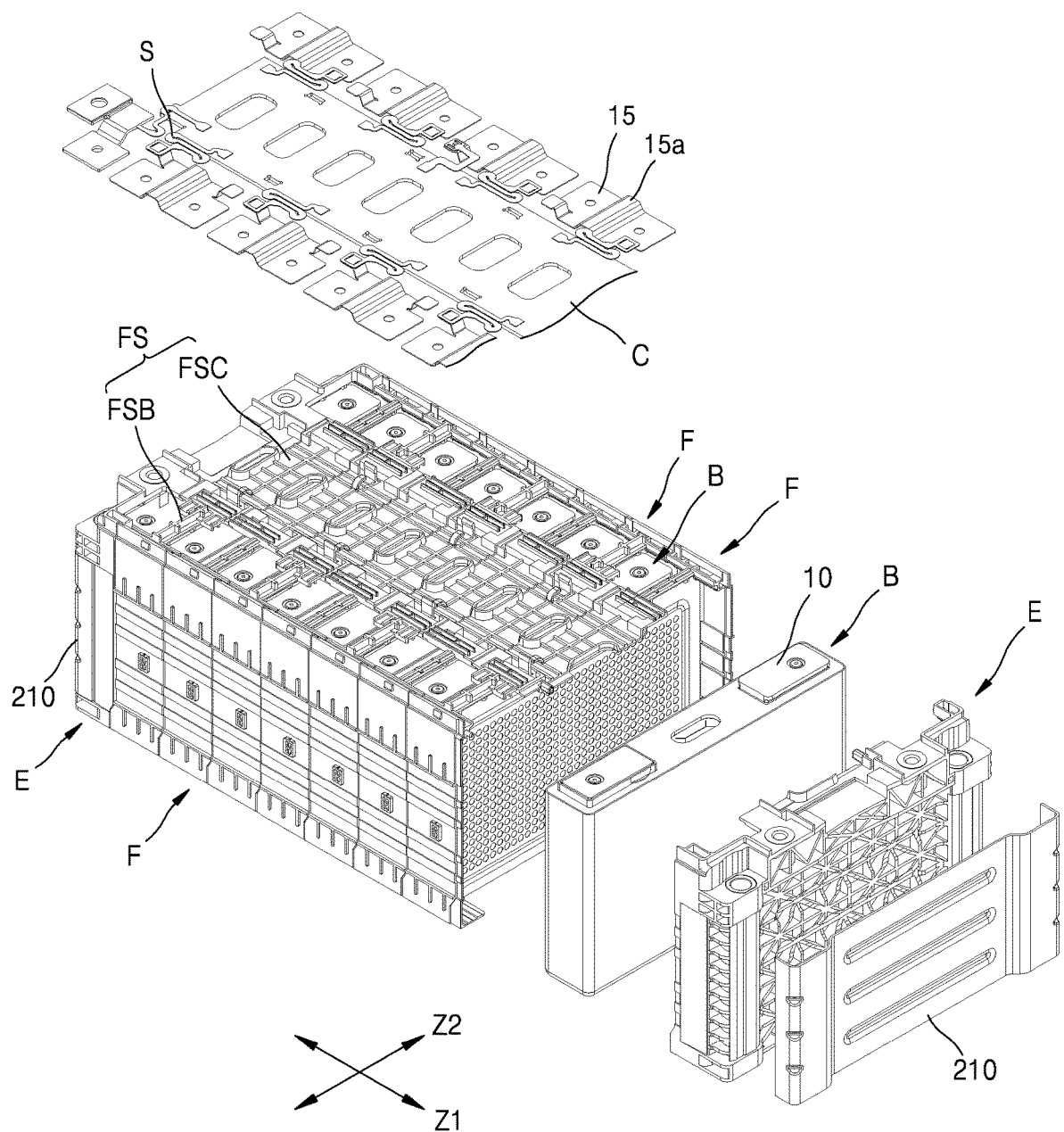
FIG. 1 is an exploded perspective view illustrating a battery pack according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Battery packs will now be described with reference to the accompanying drawings, in which exemplary embodiments are shown.

Figure 2:
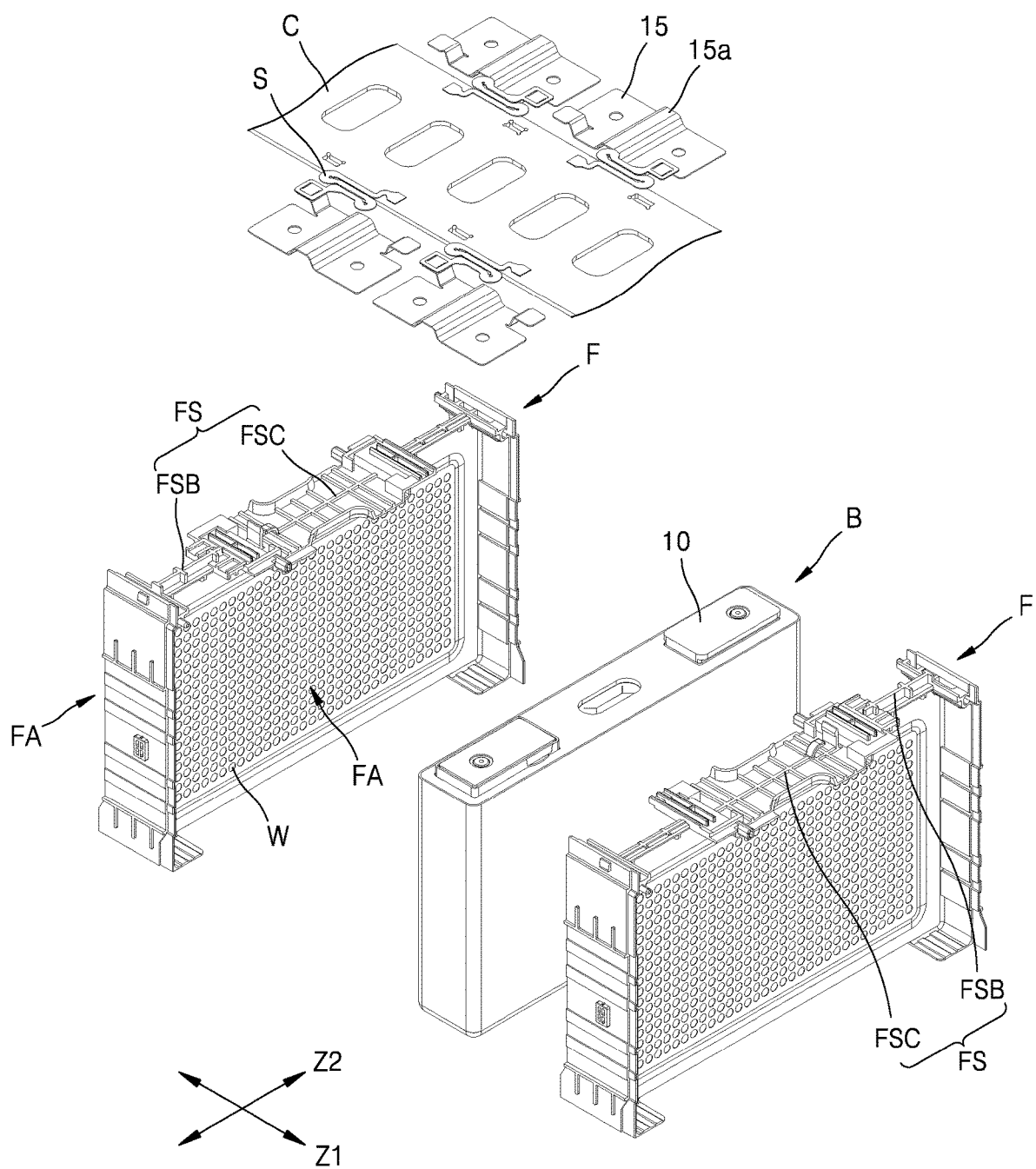
FIG. 2 is an exploded perspective view illustrating a portion of the battery pack illustrated in FIG. 1.
Figure 3:
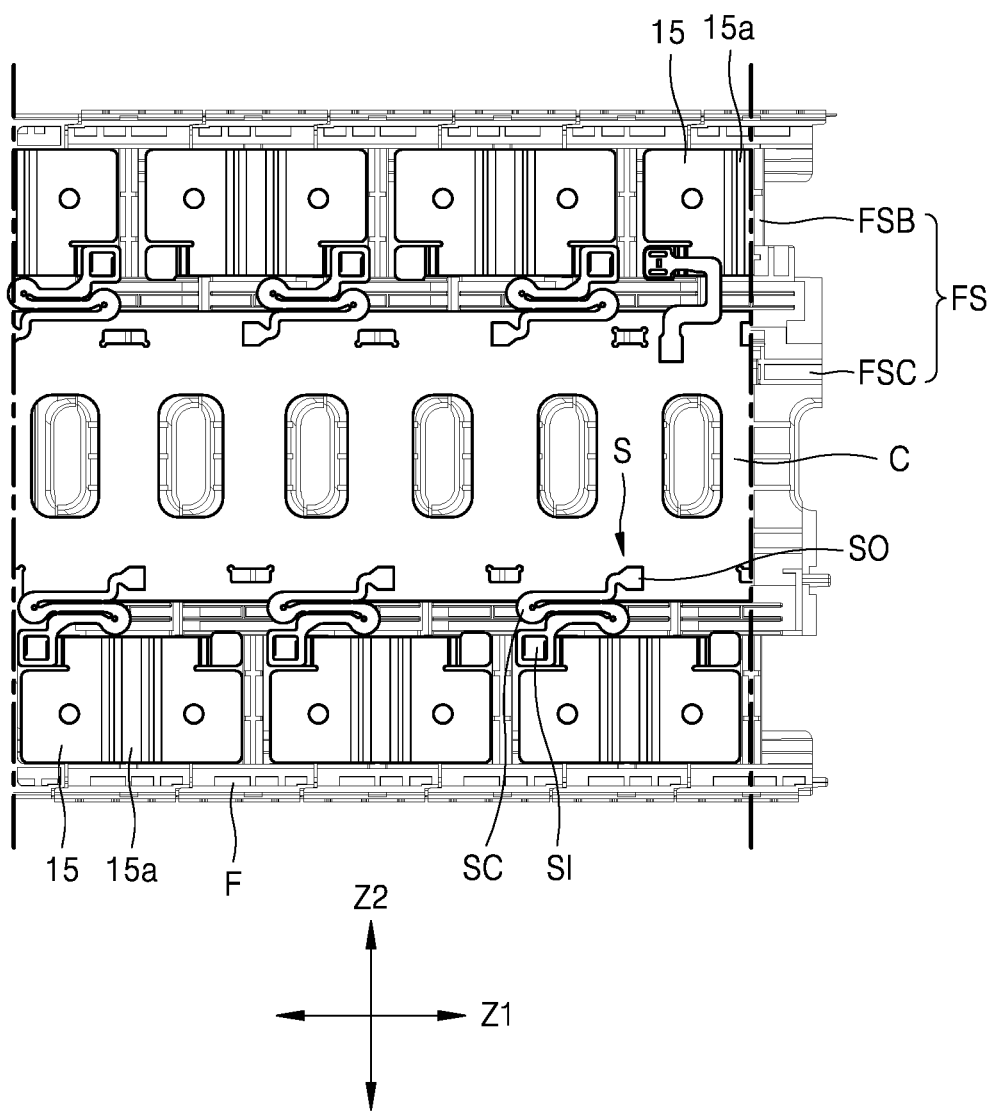
FIG. 3 is a plan view illustrating a portion of the battery pack illustrated in FIG. 1.

FIG. 1 is an exploded perspective view illustrating a battery pack according to an embodiment of the present disclosure. FIG. 2 is an exploded perspective view illustrating a portion of the battery pack illustrated in FIG. 1. FIG. 3 is a plan view illustrating a portion of the battery pack illustrated in FIG. 1.

Referring to FIGS. 1 to 3, the battery pack according to one embodiment of the present disclosure includes battery cells B and frames F arranged together with the battery cells B in a first direction Z1. The frames F face each other with the battery cells B therebetween A wiring board C is on the frames F for collecting state information (e.g., status information), such as voltage and/or temperature information, about the battery cells B from the battery cell B.

The battery cells B may be arranged in the first direction Z1. In addition, the frames F may be arranged together with the battery cells B in the first direction Z1 in such a manner that the frames F are coupled to each other with the battery cells B therebetween. The frames F may be arranged in the first direction Z1 in such a manner that a battery cell B is placed between each pair of neighboring frames F facing each other, and the neighboring frames F are coupled to each other.

Each of the frames F may define an accommodation portion FA surrounding the periphery of a battery cell B and extending along the periphery of the battery cell B to accommodate the battery cell B. For example, the frame F may extend along the periphery of the battery cell B while crossing upper, lower, and lateral sides of the battery cell B. The frame F may include the accommodation portion FA as an inner region accommodating the battery cell B, and a support portion FS as an outer region on which objects making electrical connection with the battery cell B, such as bus bars 15 and the wiring board C, are supported. For example, the support portion FS may be provided on a portion of the battery cell B crossing the upper side of the battery cell B on which electrodes 10 are located. The frame F may have an inner side surrounding the battery cell B and an outer side forming the support portion FS which provides a support base for objects making electrical connection with the battery cell B, such as the bus bars 15 and the wiring board C.

The frames F may be arranged in the first direction Z1 in such a manner that a battery cell B is placed between every pair of neighboring frames F, and the neighboring frames F are coupled to each other while facing each other. In other words, in the illustrated embodiment, all the battery cells B are surrounded by the frames F arranged forward and backward in the first direction Z1, and the frames F surround the outsides of the battery cells B placed between the frames F such that the frames F may form the exterior of the battery pack covering the battery cells B and function as a housing protecting the battery cells B. In the battery pack including the battery cells B, the array of the frames F in the first direction Z1 may substantially form the exterior of the battery pack, and the battery cells B may be placed inside the array of the frames F and may be surrounded by the frames F.

The frames F and the battery cells B may be alternately arranged in the first direction Z1, and each of the frames F may include different accommodation portions FA that accommodate neighboring battery cells B. For example, each of the frames F may include different accommodation portions FA that accommodate different battery cells B arranged forward and backward in the first direction Z1, and the different accommodation portions FA may be separated from each other by a barrier wall W. In each of the frames F, the barrier wall W may be placed between the different accommodation portions FA to separate the accommodation portions FA from each other and may block electrical and thermal interference between the different battery cells B.

Each of the battery cells B may be connected to bus bars 15 for electrical connection with neighboring battery cells B, and the wiring board C may be connected to the battery cells B to receive and collect state information (e.g., status information) such as voltage or temperature information about the battery cells B arranged in the first direction Z1. In one or more embodiments, the bus bars 15 and the wiring board C may include features forming electrical connections with the battery cells B, and such features may be supported on the support portions FS of the frames F.

Each of the support portions FS of the frames F may include a bus bar support portion FSB on which a bus bar 15 is supported (e.g., rests), and a board support portion FSC on which the wiring board C is supported (e.g., rests). The bus bar support portion FSB and the board support portion FSC may be provided on different positions of the support portion FS. For example, the bus bar support portion FSB may be provided on a left or right peripheral portion of the frame F corresponding to an electrode 10 of a battery cell B. The board support portion FSC may be provided on a center portion of the frame F. The wiring board C, which is supported on the board support portions FSC of the frames F, may be at center positions of the battery cells B such that the wiring board C may easily collect state information from a plurality of positions of the battery cells B. As described later, sensing portions S may be connected to the wiring board C to transmit state information from sides of the battery cells B (for example, from the bus bars 15 electrically connected to the battery cells B) Since the wiring board C is placed at a center position of the battery cells B, the distances between the wiring board C and the sensing portions S connected to a plurality of positions of the wiring board C may be generally uniform and may be balanced such that electrical resistance of the sensing portions S connected to the plurality of positions of the wiring board C may be balanced to prevent signal distortion.

The bus bar support portions FSB and the board support portions FSC of the frames F may have different widths. For example, the bus bar support portions FSB may be relatively narrow in order not to interfere with electrical connection between the bus bars 15 and the battery cells B (for example, the electrodes 10 of the battery cells B). The bus bar support portions FSB may support front and back end portions of the bus bars 15 which are on both sides of bent portions 15a of the bus bars 15 and may insulate neighboring bus bars 15. The bus bar support portions FSB may support both end portions of the bus bars 15 and may electrically insulate neighboring bus bars 15 from each other such that both end portions of a bus bar 15 may not make contact with end portions of neighboring bus bars 15. The bus bar support portions FSB do not need to make physical contact with both end portions of the bus bars 15 as long as the bus bar support portions FSB are placed between neighboring bus bars 15 and electrically insulate the neighboring bus bars 15 from each other. Since it is sufficient that the bus bar support portions FSB are placed between the bus bars 15 neighboring each other to prevent electrical contact between the bus bars 15, the bus bar support portions FSB may have a relatively small width sufficient not to decrease the conduction area between the bus bars 15 and the electrodes 10 of the battery cells B. If the bus bar support portions FSB have a large width like the board support portions FSC, electrical contact between the bus bars 15 and the battery cells B (for example, the electrodes 10 of the battery cells B) may be hindered, and the conduction area between the bus bars 15 and the battery cells B may be decreased. In this case, the electrical resistance of an overall charge-discharge path may be increased, and the electrical output power of the battery pack may be decreased.

The bus bar support portions FSB may be provided at left and right peripheral positions of the support portions FS corresponding to the electrodes 10 provided on left and right sides of the battery cells B in a second direction Z2. The frames F may be arranged in the first direction Z1 in patterns alternating left and right sides, and in this case, the bus bar support portions FSB may be arranged in the first direction Z1 along left and right edges in patterns alternating along left and right edges. For example, the bus bar support portions FSB may be provided on left or right sides of the board support portions FSC provided at center positions of the frames F, and as the frames F are arranged in the first direction Z1 in patterns alternating left and right sides, the bus bar support portions FSB may be arranged in the first direction Z1 on left and right sides of the board support portions FSC. In the present disclosure, a left or right direction may refer to the second direction Z2.

The board support portions FSC have a relatively large width such that the wiring board C may be stably placed and supported on the board support portions FSC. The wiring board C may be placed on the board support portion FSC of each of the frames F, and the board support portions FSC of the frames F may be connected to each other in the first direction Z1 to form a support surface extending widely in the first direction Z1, thereby providing a support base for supporting the wiring board C. That is, the board support portions FSC of the frames F that support the wiring board C may be connected to each other in the first direction Z1 to form a support surface extending widely in the first direction Z1, and thus a support base for stably supporting the wiring board C may be provided.

The bus bars 15 are for electrically connecting the battery cells B neighboring each other, and the bus bars 15 may connect the battery cells B in series, parallel, or series-parallel to each other. The bus bars 15 may electrically connect the neighboring battery cells B to each other by electrically coupling the electrodes 10 of the battery cells B. For example, the bus bars 15 may connect the neighboring battery cells B in parallel to each other by connecting electrodes 10 of the battery cells B having the same polarity or in series to each other by connecting electrodes 10 of the battery cells B having different polarities.

The bus bars 15 may be arranged to face the electrodes 10 provided on upper surfaces of the neighboring battery cells B and may electrically connect the electrodes 10 of the neighboring battery cells B to each other. For example, based on the bent portions 15a provided at center positions of the bus bars 15, both sides of the bus bars 15 may be pointed toward and coupled to the electrodes 10 of the battery cells B. A plurality of bus bars 15 may connect electrodes 10 of a pair of neighboring battery cells B.

The board support portions FSC may be placed at center positions between the bus bar support portions FSB provided at left and right peripheral portions. The wiring board C may be placed on the board support portions FSC. The wiring board C may include a plurality of conductive patterns (not shown) to collect state information about the battery cells B and transmit the state information to a battery management system (not shown). The wiring board C may be connected to the bus bars 15 used to electrically couple the neighboring battery cells B to each other and obtain information about the voltages of the battery cells B. In another embodiment of the present disclosure, the wiring board C may be connected to thermistors placed on the upper surfaces of the battery cells B to obtain information about the temperatures of the battery cells B.

The wiring board C may collect state information, for example, voltage and/or temperature information, from the battery cells B and may transmit the state information to a separate battery management system such that the battery management system may control charge-discharge operations of the battery cells B, or the charge-discharge operations of the battery cells B may be controlled by a battery management system provided together with the wiring board C.

The sensing portions S, which are flexible, may be connected to the wiring board C as media for transmitting signals relating to battery cell state information obtained from sides of the battery cells B (for example, from the bus bars 15 electrically connected to the battery cells B). The sensing portions S may be provided in the form of a flexibly deformable film.

As illustrated in FIG. 3, each of the sensing portions S may include an input port SI connected to a side of a battery cell B (for example, to a bus bar 15 electrically connected to the battery cell B) to receive state information about the battery cell B, an output port SO connected to a side of the wiring board C to output the state information about the battery cell B to the wiring board C, and a connection portion SC connecting the input port SI and the output port SO to each other. For example, the input port SI may correspond to a portion receiving state information from the side of the battery cell B (for example, from a bus bar 15 electrically connected to the battery cell B), and the output port SO may correspond to a portion through which the state information about the battery cell B is output to the wiring board C. The connection portion SC connects the input port SI and the output port SO to each other and may have a curved shape.

For example, the input ports SI of the sensing portions S may be connected to sides of the battery cells B. The input ports SI of the sensing portions S may be connected to the bus bars 15 electrically connecting the battery cells B neighboring each other and may receive voltage signals of the battery cells B through the bus bars 15. According to another embodiment of the present disclosure, the input ports SI may be connected to the thermistors placed on the upper surfaces of the battery cells B and may receive temperature signals of the battery cells B from the thermistors. The input ports SI of the sensing portions S may be considered as being connected to signal input portions for acquiring state information of the battery cells B. The signal input portions may be connected to the battery cells B for acquiring state information such as voltages and/or temperatures of the battery cells B and may be, for example, the bus bars 15 electrically connected to the battery cells B or the thermistors thermally connected to the battery cells B. The input ports SI may be welded to the signal input portions (for example, the bus bars 15) provided on sides of the battery cells B. For example, the input ports SI may be welded to the bus bars 15 using ultrasonic welding by placing the input ports SI on the bus bars 15 and then pressing the input ports SI with an ultrasonic horn (not shown), thereby applying ultrasonic vibration thereto. In another embodiment of the present disclosure, the input ports SI and the signal input portions (for example, the bus bars 15) provided on sides of the battery cells B may be coupled to each other using a conductive adhesive or the like.

The output ports SO of the sensing portions S may be connected to pads of the wiring board C, and electrical signals transmitted through the output ports SO of the sensing portions S may arrive at the conductive patterns provided on the wiring board C via the pads of the wiring board C. The output ports SO of the sensing portions S may be welded or soldered to the pads of the wiring board C or may be coupled to the pads of the wiring board C using a conductive adhesive or the like.

In FIG. 1, reference numerals E and 210 refer to end blocks and end plates, respectively. The end blocks E and the end plates 210 may be placed on outer sides of outermost battery cells B to provide a fastening force for physically restraining the battery cells B of the battery pack.

Figure 4:
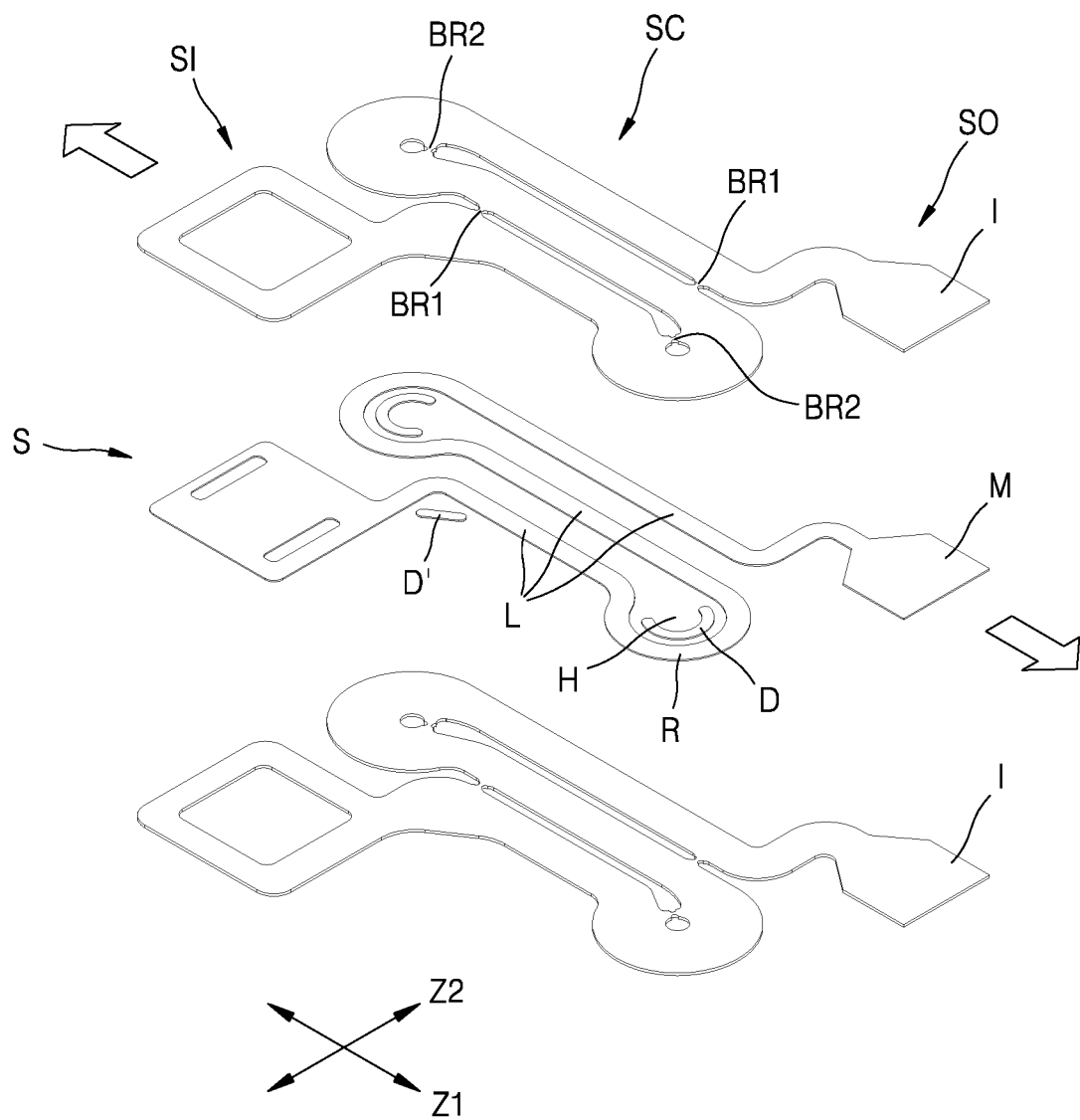
FIG. 4 is an exploded perspective view illustrating a sensing portion illustrated in FIG. 3.
Figure 5:
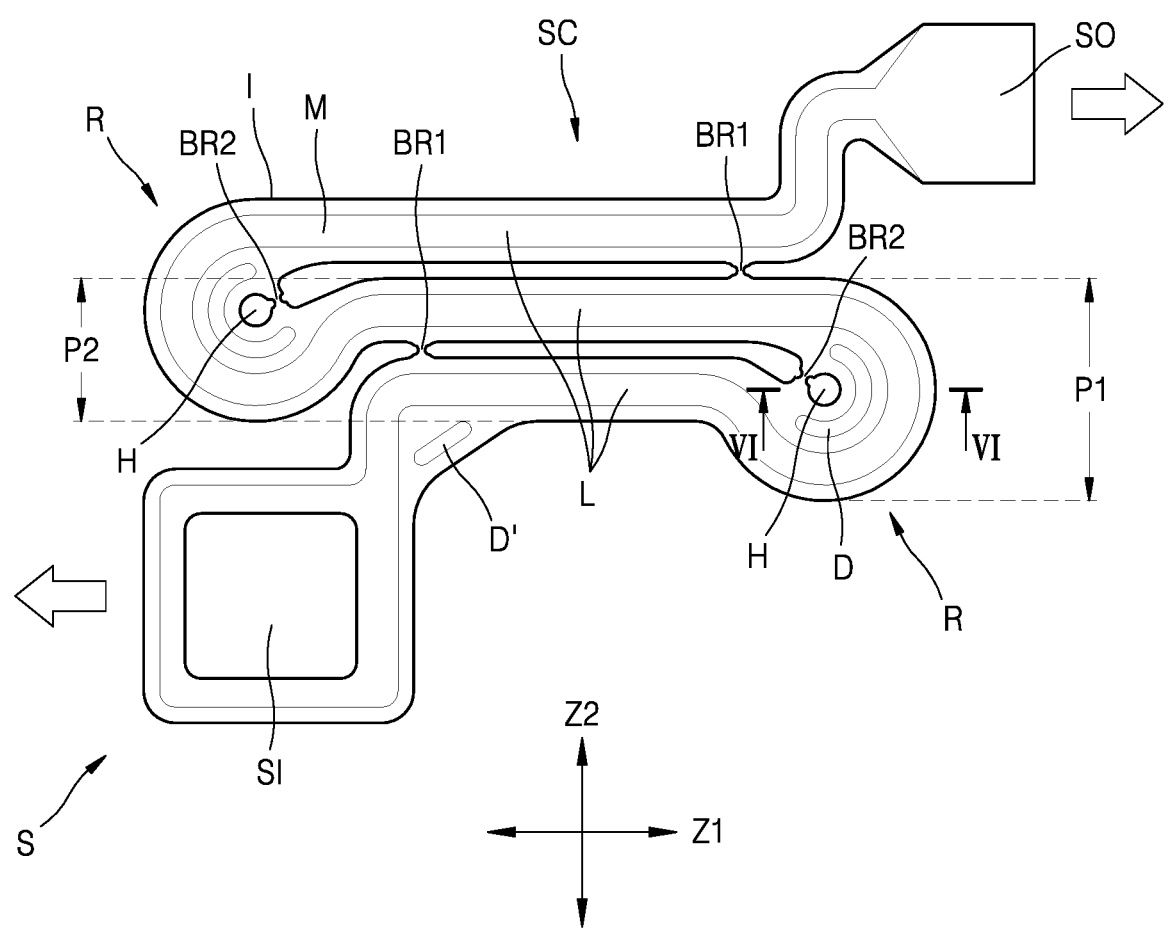
FIG. 5 is a plan illustrating the sensing portion illustrated in FIG. 3.
Figure 6:
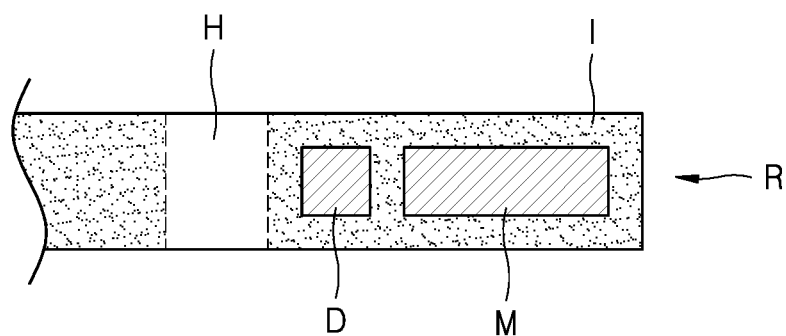
FIG. 6 is a cross-sectional view taken along line VI-VI of FIG. 5.

FIG. 4 is an exploded perspective view illustrating a sensing portion S illustrated in FIG. 3. FIG. 5 is a plan illustrating the sensing portion S illustrated in FIG. 3. FIG. 6 is a cross-sectional view taken along line VI-VI of FIG. 5.

Referring to FIGS. 4 to 6, the sensing portion S may include a conductive line M for transmitting signals relating to information about the state of battery cells B and an insulating film I in which the conductive line M is embedded for insulating the conductive line M. For example, the conductive line M may be a copper foil pattern, and the insulating film I is arranged to embed the conductive line M in the insulating film I such that electrical signals transmitted through the conductive line M may be insulated from the outside.

The conductive line M may be curved, and the insulating film I may be curved according to the shape of the conductive line M. As described above, since the conductive line M and the insulating film I are curved substantially in the same shape, the sensing portion S including the conductive line M and the insulating film I in which the conductive line M is embedded may have flexibility and may thus be flexibly deformed according to an external force.

For example, the connection portion SC of the sensing portion S may be curved in a manner such that the connection portion SC may extend in the first direction Z1 in which the battery cells B are arranged and may have spaced apart portions with curved portions R in the second direction Z2 crossing the first direction Z1. The first direction Z1 may refer to a direction in which the battery cells B are arranged, and the second direction Z2 may refer to a direction crossing the first direction Z1, for example, a direction perpendicular to the first direction Z1.

For example, the sensing portion S (or the connection portion SC of the sensing portion S) may include straight portions L extending in parallel to each other and the curved portions R connecting the straight portions L neighboring each other. For example, in one or more embodiments, the number of the straight portions L and the number of the curved portions R may each be at least two. For example, the sensing portion S may include three straight portions L and two curved portions R located at both ends of the straight portions L to connect the straight portions L neighboring each other (e.g., the sensing portion S may include first, second, and third straight portions L, a first curved portion R connecting first ends of the first and second straight portions L together, and a second curved portion R connecting second ends of the second and third straight portions L together).

For example, the straight portions L may extend in parallel to each other in the first direction Z1 and may be spaced apart from each other in the second direction Z2, and the curved portions R may connect the straight portions L neighboring (e.g., adjacent) each other. Each of the curved portions R may be curved substantially in a semicircular shape to change the extension direction of the connection portion SC in such a manner that the curved portion R connects an end portion of a straight portion L to another straight portion L neighboring the straight portion L. For example, each of the curved portions R may be curved around a penetration hole H to at least partially surround the penetration hole H and may connect end portions of neighboring straight portions L to each other.

Each of the curved portions R may be curved to connect neighboring straight portions L, and in this case, the curved portion R may be curved along a detour path greater than the distance between end portions of the neighboring straight portions L connected through the curved portion R. As shown in FIG. 5, the maximum distance (maximum span) P1 of the path of the curved portion R in the second direction Z2 perpendicular to the first direction Z1 may be greater than the maximum distance (maximum span) P2 in the second direction Z2 between the end portions of the neighboring straight portions L connected to each other via the curved portion R. For example, the curved portion R is formed by the conductive line M and the insulating film I in which the conductive line M is embedded, and the maximum distance (maximum span) P1 of the path of the curved portion R in the second direction Z2 may correspond to a distance between edges of the insulating film I forming a greater path than the conductive line M. In addition, the end portions of the neighboring straight portions L are formed by the conductive line M and the insulating film I in which the conductive line M is embedded, and the maximum distance (maximum span) P2 between the end portions of the neighboring straight portions L connected to each other via the curved portion R may be a distance between edges of the insulating film I forming a greater path than the conductive line M.

Since the curved portion R is curved to detour along a path greater than a semicircle having a diameter corresponding to a distance necessary for the curved portion R to connect the end portions of the neighboring straight portions L, for example, the maximum distance (maximum span) P2 between the end portions of the neighboring straight portions L, less stress may occur in the curved portion R when the battery cells B swell, and damage of the conductive line M or dielectic breakdown may be prevented at the curved portion R on which stress tends to concentrate. For example, when the radius of curvature (for example, centered on the penetration hole H) of the curved portion R is increased or the curvature of the curved portion R is decreased such the curved portion R follows a greater path, stress concentrating on the curved portion R may be reduced. Thus, when the curved portion R detours along a path greater than a semicircle necessary for connecting the end portions of the neighboring straight portions L, stress concentrating on the curved portion R may be reduced, and the curved portion R may not be damaged due to stress concentrating in the curved portion R.

The curved portions R may be curved around the penetration holes H to surround the penetration holes H. The penetration holes H may be located at the centers of the curved portions R. The penetration holes H may be formed to enable easy handling of the sensing portion S. For example, pins (not shown) may be coupled to penetration holes H of the sensing portion S to fix the sensing portion S and prevent deformation of the sensing portion S during manufacturing processes or transportation. That is, when pins (not shown) are inserted in the penetration holes H of the sensing portion S, the sensing portion S may be stably fixed and prevented from deforming, and since the sensing portion S which is flexible does not flutter or deform, the sensing portion S may be easily handled.

The connection portion SC may include bridges BR1 and BR2 connecting neighboring patterns along the path of the connection portion SC. For example, the bridges BR1 and BR2 may be provided between neighboring straight portions L and/or near the penetration holes H of the curved portions R. For example, the bridges BR1 and BR2 may include a first bridge BR1 connecting each of the neighboring (e.g., adjacent) straight portions L and a second bridge BR2 surrounding an inner side of each of the penetration holes H. The first bridge BR1 may be formed between each of the neighboring straight portions L extending in parallel to each other, and the second bridge BR2 may be formed near the penetration hole H of each of the curved portions R. Each of the curved portions R may be curved to surround an outer side of the respective penetration hole H, and the second bridge BR2 may surround an inner side of the respective penetration hole H such that the curved portion R and the second bridge BR2 may together form a closed loop surrounding the respective penetration hole H.

The bridges BR1 and BR2 may be formed of the insulating film I of the connection portion SC. For example, the connection portion SC may include a plurality of conductive lines M through which state information of the battery cells B is transmitted and the insulating film I enclosing the conductive lines M, wherein the bridges BR1 and BR2 may be integral portions of the insulating film I. As described later, the bridges BR1 and BR2 may absorb stress occurring when the battery cells B swell and may be broken when the swelling of the battery cells B increases, and thus the bridges BR1 and BR2 may be formed of only the insulating film I but not the conductive line M.

When the battery cells B swell and the connection portion SC (or the sensing portion S) is forced to deform, the bridges BR1 and BR2 may resist the swelling of the battery cells B to some degree and absorb stress caused by the swelling of the battery cells B, thereby reducing stress propagating to the curved portions R. For example, the bridges BR1 and BR2 may prevent deformation of the curved portions R to some degree while resisting swelling of the battery cells B and may reduce stress, which would otherwise be caused by the swelling propagating to the curved portion R, by absorbing the stress. When the swelling of the battery cells B increases, the bridges BR1 and/or BR2 may break. When the degree of swelling of the battery cells B is relatively low, the bridges BR1 and BR2 may reduce stress occurring in the curved portions R and prevent the curved portions R from being damaged. Thereafter, if the swelling of the battery cells B increases, as described later, the connection portion SC may follow the swelling of the battery cells B while being lifted away from a main plane, thereby minimizing stress occurring in the curved portions R.

The sensing portion S transmits state information such as the voltages and/or temperatures of the battery cells B to the wiring board C. To this end, the sensing portion S may include the conductive line M through which signals relating to state information about the battery cells B are transmitted. In addition to the conductive line M, the sensing portion S may further include isolated dummy patterns D, as illustrated in FIG. 4, that do not transmit electrical signals. The dummy patterns D may be provided on the connection portion SC of the sensing portion S for reinforcing the connection portion SC. For example, the dummy patterns D may be provided on the curved portions R of the connection portion SC on which stress may concentrate.

The curved portions R may include the conductive line M as a medium for transmitting signals and the dummy patterns D provided adjacent to the conductive line M to protect the conductive line M while bearing stress together with the conductive line M. The conductive line M and the dummy patterns D may be formed at neighboring positions using the same material. The dummy patterns D may bear stress acting on the conductive line M at positions neighboring the conductive line M and may be formed through the same patterning process as the conductive line M, that is, may be formed in a process of forming the conductive line M without having performing an additional process, thereby preventing performing wasteful processes. For example, the dummy patterns D and the conductive line M may be formed as similar copper foil patterns and may be covered with the same insulating film I. The dummy patterns D may be narrower than the conductive line M. Since the dummy patterns D do not transmit electrical signals, the electrical resistance of the dummy patterns D may not be considered unlike the conductive line M, and thus it may be sufficient that the dummy patterns D have a width for reinforcing the curved portions R.

The dummy patterns D may be formed along a path parallel to the conductive line M and may be placed inside the conductive line M along the paths of the curved portions R. For example, the dummy patterns D may be placed between the conductive line M and the penetration holes H corresponding to the centers of the curved portions R. As described above, the dummy patterns D may be formed at positions neighboring the conductive line M and closer to the penetration holes H than the conductive line M. In addition, the dummy patterns D may be formed at inner positions on which relatively higher stresses may concentrate than an outer position at which the conductive line M is formed. That is, instead of forming the dummy patterns D at positions outside the conductive line M, the dummy patterns D may be formed at positions inside the conductive line M at which a relatively large amount of stress may concentrate. Since the dummy patterns D are not for transmitting signals, even if the dummy patterns D are damaged, transmission of signals relating to state information about the battery cells B may not be affected.

The dummy patterns D may be isolated patterns which are not electrically connected to the wiring board C. That is, the dummy patterns D may be isolated patterns separate from the conductive line M connected to the wiring board C. Both end portions of the dummy patterns D are disconnected end portions, and the insulating film I covering the dummy patterns D and the conductive line M may also cover both end portions of the dummy patterns D.

Referring to FIG. 5, in addition to the dummy patterns D formed at the curved portions R, another dummy pattern D' may be formed at a connection section of the input port SI and be bent or angled to connect the input port SI and a straight portion L. Like the dummy patterns D, the dummy pattern D' may be an isolated pattern reinforcing the connection section of the input port SI.

Referring to FIG. 3, the battery pack may include the frames F facing each other and coupled to each other with the battery cells B therebetween in the first direction Z1 in which the battery cells B are arranged. During charge-discharge operations, the battery cells B may swell in the first direction Z1, and the frames F coupled to each other forward and backward with the battery cells B therebetween in the first direction Z1 may slide to accommodate deformation when the battery cells B swell. As described above, when the battery cells B swell and expand in the first direction Z1, the frames F may move in the first direction Z1, and thus the relative positions of the input ports SI attached to the bus bars 15 placed on the frames F and the output ports SO attached to the wiring board C may change along the first direction Z1. In this case, the connection portions SC connecting the input ports SI and the output ports SO may deform to accommodate deformation in the first direction Z1.

The sensing portions S including the connection portions SC are provided in the form of a film including a thin insulating film I and a conductive line M being a copper pattern embedded in the thin insulating film I. As described above, each of the sensing portion S is formed in the form of a film placed in the same plane, and the plane in which the sensing portion S is placed may be referred to as a main plane. When the sensing portion S is forced to deform as the battery cells B swell, the sensing portion S, for example, the connection portion SC of the sensing portion S is deformed while the sensing portion S is lifted from the main plane such that the curved portions R forming both ends of the connection portion SC may face each other, thereby absorbing variations in the relative positions of the input port SI and the output port SO when the battery cells B swell.

When tension is applied to the sensing portion S in the first direction Z1 as the battery cells B swell, the bridges BR1 and BR2 formed between neighboring patterns of the connection portion SC may resist deformation to some degree and may break as the swelling of the battery cells B increases, and then the connection portion SC may be deformed while being lifted away from the main plane such that the curved portions R forming both ends of the connection portion SC may face each other. That is, the curved portions R forming both ends of the connection portion SC may be deformed while being lifted away from the main plane to face each other. For example, while the curved portions R formed on both ends of the connection portion SC are lifted to face each other, straight portions L adjoining the curved portions R may be lifted in directions crossing each other. In this manner, while the connection portion SC absorbs variations in the positions of the input port SI and the output port SO when the battery cells B swell, the connection portion SC may flexibly connect the input port SI and the output port SO that move away from each other in the first direction Z1 as the battery cells B swell.

Figure 7:
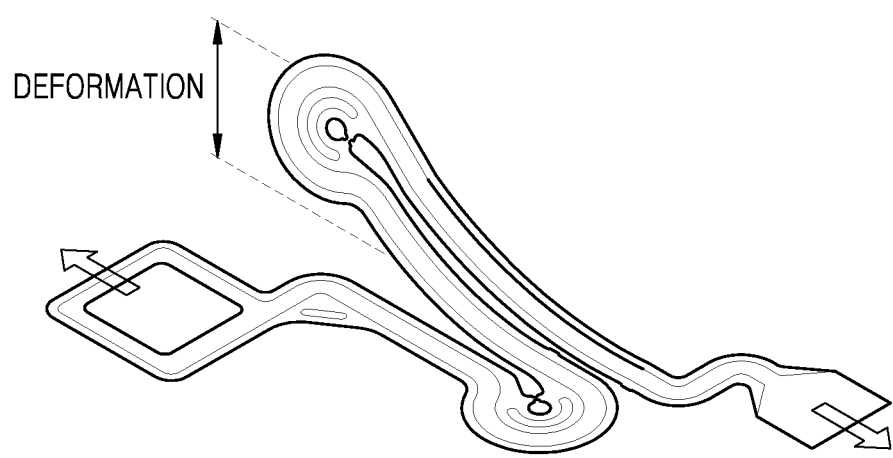
FIG. 7 is a view illustrating a state in which the sensing portion shown in FIG. 3 is deformed as battery cells swell.

FIG. 7 is a view illustrating a state in which the sensing portion S shown in FIG. 3 is deformed as the battery cells B swell.

Referring to FIG. 7, in response to swelling of the battery cells B, the curved portions R formed on both ends of the connection portion SC are deformed while being lifted to face each other. In this case, the expression "while the curved portions R formed on both ends of the connection portion SC are deformed as being lifted away from the main plane to face each other, variations in the positions of the input port SI and the output port SO caused by swelling of the battery cells B are absorbed" may mean that accumulation of stress in the connection portion SC is prevented because the connection portion SC absorbs positional variations caused by swelling of the battery cells B while being flexibly deformed in response to the swelling.

According to the present disclosure, the battery pack is structurally improved such that the sensing portions S for transmitting signals relating to information about the states of the battery cells B may absorb positional variations caused by swelling of the battery cells B while being flexibly deformed in response to the swelling, thereby preventing accumulation of stress in the sensing portions S and damage or dielectric breakdown of the conductive lines M that transmit signals.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery pack comprising:
    a plurality of battery cells arranged in a first direction;
    a wiring board configured to collect state information about the battery cells from the battery cells; and
    a sensing portion comprising an input port through which the state information about the battery cells is input, an output port coupled to the wiring board and through which the state information about the battery cells is output, and a connection portion between the input port and the output port,
    wherein the connection portion extends in a curved shape comprising portions spaced apart from each other in a second direction crossing the first direction, and
    wherein the connection portion comprises:
        a plurality of straight portions extending parallel to each other, the plurality of straight portions comprising a first straight portion, a second straight portion, and a third straight portion;

a plurality of curved portions, a first curved portion of the plurality of curved portions connecting first end portions of the first straight portion and the second straight portion to each other, and a second curved portion of the plurality of curved portions connecting second end portions of the second straight portion and the third straight portion to each other; and a first bridge connecting adjacent straight portions of the plurality of straight portions to each other, wherein a maximum distance along the second direction between portions of the first curved portion is greater than a distance between the first end portions of the first and second straight portions, and wherein a maximum distance along the second direction between portions of the second curved portion is greater than a distance between the second end portions of the second and third straight portions.

2. The battery pack of claim 1, wherein the plurality of straight portions extend in parallel to each other in the first direction.

3. The battery pack of claim 1, wherein each curved portion of the plurality of curved portions is curved to connect adjacent end portions of the adjacent straight portions and detour along a path greater than a distance between the adjacent end portions of the adjacent straight portions.

4. The battery pack of claim 1, wherein the connection portion comprises:
a conductive line through which the state information about the battery cells is transmitted; and
an insulating film in which the conductive line is embedded.

5. The battery pack of claim 4, wherein the connection portion has a film shape extending on a main plane.

6. The battery pack of claim 5, wherein the plurality of curved portions provided on both ends of the connection portion in the first direction are configured to be deformed and lifted away from the main plane to face each other in response to swelling of the battery cells in the first direction.

7. The battery pack of claim 1, wherein each curved portion of the plurality of curved portions extends in a curved shape surrounding a penetration hole through the sensing portion.

8. The battery pack of claim 1, wherein each curved portion extends in the curved shape surrounding an outer side of the penetration hole, and
wherein the connection portion further comprises a second bridge surrounding an inner side of the penetration hole.

9. The battery pack of claim 8, wherein the first and second bridges are in an insulating film of the connection portion.

10. The battery pack of claim 1, wherein each curved portion of the plurality of curved portions comprises:
a conductive line through which the state information about the battery cells is transmitted; and
a dummy pattern isolated from and adjacent to the conductive line.

11. The battery pack of claim 10, wherein the dummy pattern is inside the conductive line along a path of a curved portion of the plurality of curved portions.

12. The battery pack of claim 11, wherein the curved portion extends in a curved shape surrounding a penetration hole formed through the sensing portion, and
the dummy pattern is between the penetration hole and the conductive line.

13. The battery pack of claim 10, wherein the dummy pattern has a smaller width than a width of the conductive line.

14. The battery pack of claim 10, wherein the conductive line and the dummy pattern comprise a same conductive material and are covered with a same insulating film, and
wherein the same insulating film covers both end portions of the dummy pattern.

15. The battery pack of claim 1, wherein the input port of the sensing portion is connected to a bus bar through which adjacent battery cells of the plurality of battery cells are electrically coupled to each other.

* * * * *